March 6, 1962 G. NAGY 3,024,368

LINEAR RAMP WAVEFORM GENERATING CIRCUIT WITH PROVISION TO CAUSE STEPPING

Filed Nov. 21, 1960

GEORGE NAGY
INVENTOR.

BY Nathan N. Kallman

ATTORNEY

United States Patent Office 3,024,368

Patented Mar. 6, 1962

3,024,368

LINEAR RAMP WAVEFORM GENERATING CIRCUIT WITH PROVISION TO CAUSE STEPPING

George Nagy, Redwood City, Calif., assignor to Ampex Corporation, Redwood City, Calif., a corporation of California Filed Nov. 21, 1960, Ser. No. 70,710
12 Claims. (Cl. 307—88.5)

Figure 1:
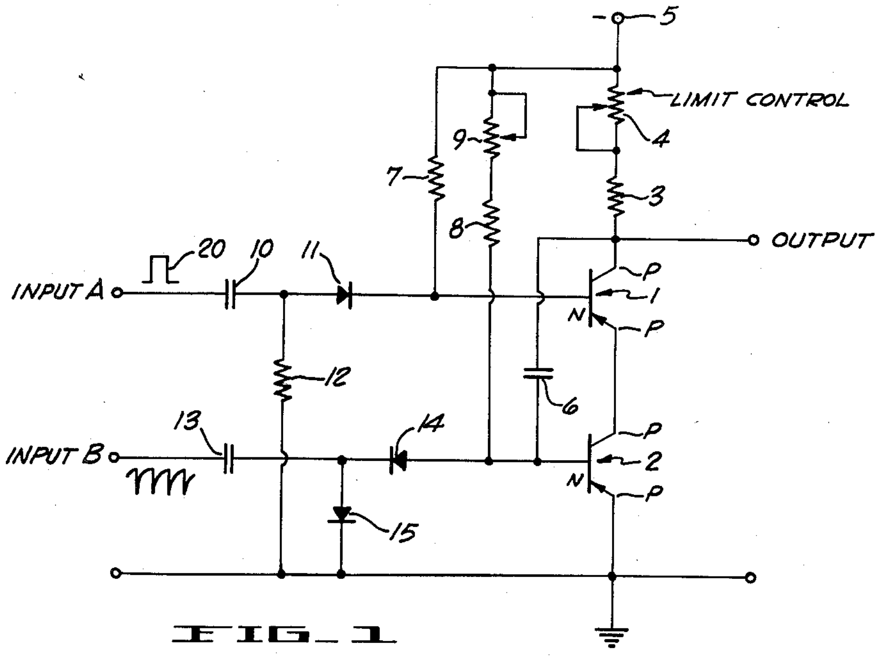

This invention relates to electrical circuits for generating particular voltage waveforms and more particularly to such a circuit for generating a linear ramp waveform with a provision for control of the output waveform in discrete steps.

Many applications, as for example a magnetic tape recording system employed in the recording of television programs for subsequent rebroadcasting, require the provision of various electrical signals of selected wave shapes, amplitudes and repetition rates. In particular, in a standard pattern generator unit employed in such a system, a stair step signal in the form of a series of successive step shaped voltage waveforms is required. To serve adequately, the discrete changes in these waveforms must be of equal magnitude in order to prevent unwanted distortion of the pattern to be presented on the cathode ray tube screen. Moreover, in addition to the stair step voltage waveform just described, it is often desired in such a system to provide a ramp-shaped waveform having a linear rate of change of voltage with respect to time.

Circuits are known which are capable of providing linear ramp-shaped waveforms suitable for use in sweep generator circuits. Moreover, circuits are known which are capable of providing an output stair step waveform having suitably spaced voltage changes of discrete amplitudes. Such circuits as are known, however, usually are more complex or less stable than is desired for recording and display purposes. In general, those known circuits which provide a stair step shaped output waveform involving the superposition of suitably spaced step voltage changes upon a linearly changing sweep signal are too complex to be acceptable in a low cost stair step waveform generator.

It is therefore an object of this invention to provide an improved electrical circuit for a stair step waveform generator.

An additional object of this invention is to provide a stair step waveform generator circuit employing semiconductor devices exclusively for the control elements.

Another object of the invention is to provide a single circuit which is adjustable to generate either a linear ramp-shaped waveform or a stair step shaped waveform.

It is a further object of this invention to provide simpler and more economical arrangements for such purposes than have heretofore been realized.

Briefly, circuits in accordance with the invention utilize a pair of transistors having their principal current paths arranged in a series connection but having their control electrodes available for the application of separate control signals. A feedback circuit path including a capacitor is provided between the output electrode of one transistor and the input electrode of the other. A discharge path of variable resistance is provided for the capacitor. For one setting of the discharge resistance a linearized ramp-shaped waveform is derived at the output of the circuit from the above mentioned output electrode of the one transistor. This waveform is made linear with time rather than following the usual exponential relationship of a simple RC network by the interconnection of the associated transistors which supply current to the capacitor discharge path in varying degree as the voltage across the capacitor changes in order to compensate for the exponential current decay. Thus, an extremely linear ramp-shaped waveform is generated simply and economically by circuits in accordance with the invention.

The desired inclusion of discrete voltage changes at selected intervals in the output waveform so as to generate a signal following a stair step function is effected, in accordance with an aspect of the invention, by the application of negative pulses on the input electrode of the second transistor when the discharge path resistance is adjusted to a second setting. Thus, in accordance with the invention, without the addition of further circuitry which would otherwise complicate the waveform generator, the circuit of the invention may be operated to provide either a linear ramp-shaped waveform or a stair step waveform at the output as desired.

Figure 2:
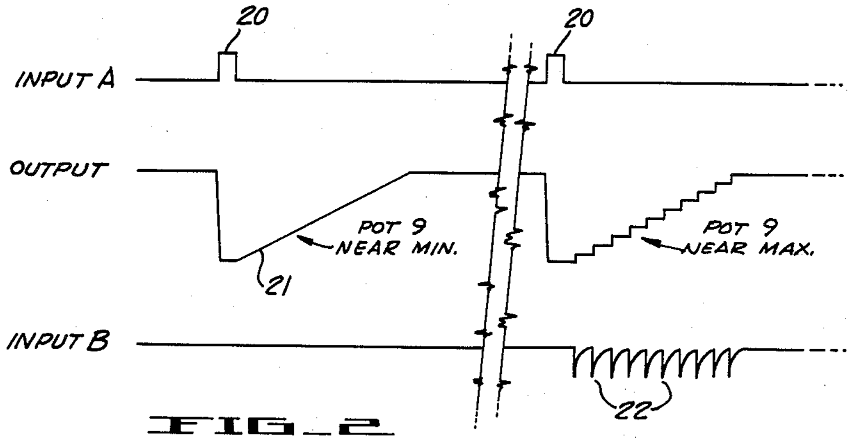

A better understanding of the invention may be gained from the following detailed description taken in conjunction with the drawing, in which:

FIGURE 1 is a schematic representation of an electrical circuit in accordance with the invention; and FIGURE 2 depicts certain waveforms useful in explaining the operation of the circuit of FIGURE 1.

In FIGURE 1, which represents an electrical circuit in accordance with the invention, first and second P-N-P type transistors 1 and 2 respectively are shown connected in series. The emitter of the second transistor 2 is connected to a reference potential, in this case ground, and the collector of the first transistor 1 is connected to an output terminal and also through a pair of series load resistors 3 and 4 to a negative potential source 5. A capacitor 6 is connected between the collector of the first transistor 1 and the base of the second transistor 2. Bias is supplied to the base of the first transistor 1 by means of a resistor 7 connected to the negative source 5. Similarly, bias is supplied to the base of the second transistor 2 by means of a pair of series-connected resistors 8 and 9, also returned to the negative source 5. A first input terminal, designated Input A, is connected to the base of the first transistor 1 through a differentiating network including a capacitor 10 and a resistor 12 and through a diode 11 poled to pass positive pulses to the first transistor 1. A second input terminal, designated Input B, is connected to the base of the second transistor 2 through a coupling capacitor 13 and a diode 14 poled to pass negative pulses to the second transistor 2. A second diode 15 serves as a clamp between ground and the common point between the capacitor 13 and the diode 14.

The resistors 4 and 9 are shown as potentiometers which serve to provide various adjustments in the respective resistive paths and thereby control the shape of the output waveform developed in response to the respective input signals. In the operation of the circuit of FIGURE 1, it will first be assumed that the potentiometer 9, which may be called a slope control resistor 9, is in a position to provide minimum resistance in the path between the base of the second transistor 2 and the negative source 5. In the quiescent condition of the circuit, therefore, the capacitor 6 has substantially no charge upon it because the transistors 1 and 2 are both conducting readily and the collector of the first transistor 1 is near ground potential. If a positive pulse such as the pulse 20 of FIGURE 2 is applied at the Input A terminal, the first transistor 1 is cut off. The capacitor 6 charges rapidly through the emitter-base path of the second transistor 2 and through the resistive elements 3 and 4. The potentiometer 4 may also be termed a limit control resistor 4, and may be adjusted to determine the point at which the capacitor 6 ceases charging. That is, the limit control resistor 4 is used to vary the time constant of the charging path of the capacitor 6 so that the charge received by the capacitor 6 at the time of termination of the pulse 20 may be controlled thereby. The waveform 21 of FIG- URE 2, represented as appearing at the output terminal, corresponds to a minimum setting of the limit control resistor 4, indicating that the capacitor 6 reaches its full charge before the pulse 20 is terminated.

Upon the removal of the pulse 20 from the Input A terminal, and with the slope control resistor 9 near its minimum resistance position, the capacitor 6 begins discharging through the paths comprising the resistors 8 and 3 and the slope and limit control resistors 9 and 4 respectively. During this time the second transistor 2 conducts with a substantially constant, small potential difference across its base-emitter junction so that the lower terminal of the capacitor 6 is maintained very near ground potential. Thus, as the capacitor 6 discharges, the output terminal rises in potential. This rise is maintained substantially linear in accordance with an aspect of the invention because the two transistors 1 and 2 supply additional current to the resistors 3 and 4 to compensate for the decrease in current therethrough from the capacitor 6 as the charge on the capacitor 6 is reduced. This additional current from the two transistors 1 and 2 linearizes the slope of the waveform present at the output terminal and advantageously results in a linear waveform having the requisite characteristics suitable for use, for example, as the sweep control of an electron beam.

Moreover, in accordance with another aspect of the invention, the circuit of FIGURE 1 is arranged so that a stair step output waveform may be generated having uniform step changes of potential throughout the waveform. As has already been mentioned, the slope control resistor 9 of FIGURE 1 may be varied to control the slope of the output waveform. When the slope control resistor 9 is adjusted to a sufficiently large value of resistance, the capacitor 6 is prevented from discharging and maintains the particular potential at which it is set. At this setting of the slope control resistor 9, the slope of the output waveform may be considered to be zero. The waveforms related to this operation of the circuit of FIGURE 1 are depicted in the right hand half of FIGURE 2.

After the capacitor 6 is charged as before by the application of a pulse 20 at the Input A terminal, the charge is maintained thereon until negative pulses 22 are applied at the Input B terminal. Each negative pulse 22 passes through the capacitor 13 and the diode 14 to remove a specific quantum of charge from the capacitor 6. Upon the removal of each quantum of charge from the capacitor 6, the bias on the second transistor 2 is varied slightly in a step-wise fashion so that the current through the resistors 3 and 4 is increased in quantum jumps. Consequently, the potential at the output terminal is stepped in a positive direction by a corresponding amount, thus producing the output waveform shown in the right half of FIGURE 2. The above described linearizing effect results from the cooperative relationship between the second transistor 2 and the capacitor 6 because in accordance with the invention an extremely constant relationship is maintained in the voltage changes at the output produced by each of the negative input pulses 22, regardless of where the particular pulse occurs in the multipulse sequence. Accordingly, this stair step shaped output waveform is most suitable for the control of the intensity of an electron beam employed in the generation of a test pattern in defining the various gray levels between white and black.

It will be understood by those skilled in the art that an equivalent arrangement employing N-P-N transistors in place of the P-N-P transistors shown in the exemplary circuit of FIGURE 1 may be provided within the spirit of the present invention. In such an equivalent arrangement the polarities of the control and output signals and of the operating potential source would be reversed but the circuit would function substantially as described.

Although specific arrangements of the invention have been mentioned and described above in order to illustrate the operation thereof, it will be appreciated that the invention is not to be restricted to these arrangements.

Accordingly, any and all modifications, variations or equivalent arrangements falling within the scope of the annexed claims should be considered to be a part of the invention.

What is claimed is:

1. An electrical circuit for generating a controllably variable output waveform comprising a first variable impedance current path including first and second transistors connected in series, means for individually biasing the transistors including a second variable impedance current path connected to the base of the second of the transistors, a capacitor connected between the base of the second transistor and a collector of the first transistor, means for blocking conduction in the first transistor to charge the capacitor, and means for causing the capacitor to discharge at a linear rate for a selected setting of variable impedance in the second current path.

2. An electrical circuit for producing a controllably variable output waveform comprising a first variable impedance current path including a pair of transistors in series connection, means for individually biasing the transistors including a second variable impedance current path connected to the base of the second of the transistors, a capacitor connected between the base of the second transistor and the collector of the first transistor, means for blocking current in the first transistor in order to charge the capacitor, and means for removing charge from the capacitor at a predetermined rate.

3. An electrical circuit in accordance with claim 2 wherein the second current path includes a potentiometer having a setting such that the first and second transistors provide a linear change of potential with time at the collector of the first transistor.

4. An electrical circuit in accordance with claim 2 wherein said charge removing means includes means for discharging the capacitor by discrete equal increments of charge in order to produce an output waveform at the collector of the first transistor having the appearance of a series of substantially identical stair steps.

5. An electrical circuit in accordance with claim 4 wherein said means for removing charge from the capacitor in discrete equal increments comprises means for applying a series of negative pulses to the base of the second transistor.

6. An electrical circuit in accordance with claim 2 wherein the first current path includes a variable resistance for determining the limit to which the capacitor is charged by the blocking of the first transistor.

7. An electrical circuit comprising a source of operating potential, a first current path connected between ground and said source comprising a pair of transistors connected in series with a load resistance, each of said transistors having base, emitter and collector electrodes, a biasing resistor connecting the base of the first transistor to the source, a second current path connecting the base of the second transistor to the source, a capacitor connected between the base of the second transistor and the collector of the first transistor, an output terminal connected to the collector of the first transistor, and means individually connected to the bases of the first and second transistors for applying control signals thereto.

8. An electrical circuit in accordance with claim 7 wherein the means for applying control signals includes means for blocking the first transistor in order to charge the capacitor and wherein the second current path includes variable impedance means for controlling the slope of the waveform at the output terminal when the capacitor discharges.

9. An electrical circuit in accordance with claim 8 wherein the control signal applying means includes means for applying negative pulses to the second transistor in order to remove discrete increments of charge from the capacitor.

10. An electrical circuit for generating an output waveform which varies by substantially identical discrete voltage increments in response to applied control signals comprising first and second transistors arranged in series, a source of operating potential, a load impedance connected between the collector of the first transistor and the source, a capacitor connected between the collector of the first transistor and the base of the second transistor, individual biasing impedances connected respectively between the source and the bases of the first and second transistors, means for developing a predetermined charge condition upon the capacitor, and means for removing charge from the capacitor in discrete increments.

11. An electrical circuit in accordance with claim 10 wherein the charge removing means comprises means for applying negative pulses of predetermined amplitude to the base of the second transistor.

12. An electrical circuit in accordance with claim 10 wherein the means for developing a charge condition includes means for blocking the first transistor to charge the capacitor and variable impedance means connected between the transistors and the source for limiting the current to said capacitor.

References Cited in the file of this patent

UNITED STATES PATENTS

| | | |
|---|---|---|
| 2,871,378 | Lohman | Jan. 27, 1959 |
| 2,945,135 | Wilhelmsen | July 12, 1960 |